Jan. 16, 1934.  E. B. PAINE ET AL  1,943,392
METHOD OF AND MEANS FOR TESTING CABLES
Filed Dec. 22, 1930  4 Sheets-Sheet 3

Inventors:
Ellery B. Paine
Hugh A. Brown
Joseph Tykocinski-Tykociner
By Brown, Jackson, Boettcher & Dienner
Attys.

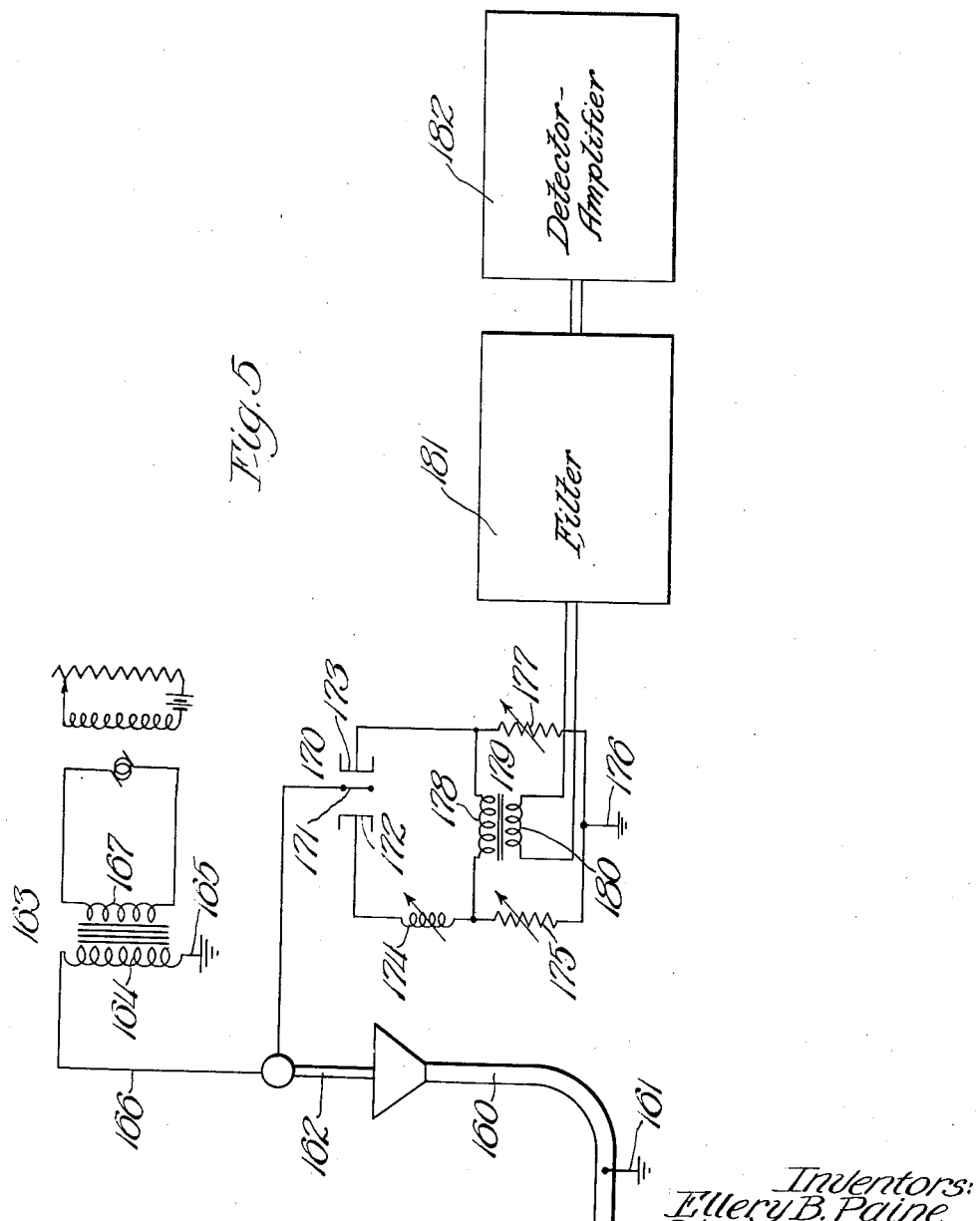

Patented Jan. 16, 1934

1,943,392

UNITED STATES PATENT OFFICE 1,943,392

METHOD OF AND MEANS FOR TESTING CABLES

Ellery B. Paine, Joseph Tykocinski-Tykociner, and Hugh A. Brown, Urbana, Ill., assignors to Board of Trustees, University of Illinois, Urbana, Ill., a corporation of Illinois Application December 22, 1930
Serial No. 504,046

18 Claims. (Cl. 175—183)

This invention relates to method of and means for testing insulation.

In the manufacture of electrical devices, such as cables, condensers, and the like, an electrical conductor is frequently insulated by being wrapped with a plurality of layers of an insulating material, such as paper, which is subsequently impregnated in an impregnating oil of high dielectric strength. The resulting insulating medium is superior to either paper alone or oil alone only when the wrapping and impregnation of the material used in this wrapping is complete, so that the resulting medium is free from voids or gas pockets and as near homogeneous as it is possible to make it.

In the operation of devices of this kind, particularly cables, it has been observed that despite the carefully drawn manufacturing specifications and rigorous application of tests to predetermine the quality of the insulation and the fitness of the cables for service, cables frequently fail by reason of breakdown of the insulating medium.

Our present invention relates to a determination of the presence of imperfections and inhomogeneities in the insulation which renders breakdown probable, and to a testing arrangement whereby the presence of these irregularities can be determined during the manufacture of the cable and also after the cable has been installed in service. The invention is not, however, limited to its application to insulated cables, as condensers and the like, may also be tested within the teachings of the invention.

It is believed that where the insulation or insulating mediums are homogeneous, and therefore free from bubbles of gas or air or other imperfections and irregularities they are of high quality and will remain so over a long period of service when subjected to their rated voltages. It is also believed that if bubbles of gas or air or other substance which disrupt the homogeneity of the mediums are present in the mediums, the cable will deteriorate rapidly and ultimate breakdown of the insulation will occur after a relatively short service exposure to the potential for which the cable is designed. Observations and tests made on a large number of samples have substantiated these beliefs to a very large extent.

The accuracy of this belief has been substantiated to a large degree by the difficulties experienced in obtaining balances on the alternating current bridges commonly employed by those skilled in the art to determined the capacity and power factor of the insulation cables, condensers and the like. In such bridges the indicating device, usually a telephone receiver, produces zero tone when the bridge is in balance, that is, the receiver is connected into the circuit at points which are at the same potential and in the same phase relation when the bridge is balanced.

This form of bridge has been commonly used heretofore in the manufacture of cables to determine the capacity and power factor of the insulation between the conductors and the cable sheath. From the data thus collected and a knowledge of the dielectric constants of the oil and insulated material, the quality of insulation has been determined.

In view of our beliefs as above expressed, and of the substantiation of these beliefs by experiments and test data, we have not been satisfied with power factor measurements as an indication of the successful testing of insulation but rather have regarded the measurement of power factor as a partial indication of conditions within the insulation which will soon lead to deterioration and break down.

The principal object of our invention is to provide a method of directly measuring the degree of impregnation to detect incipient faults in insulation, at the time of their detection, are so small and undeveloped as to be undetectable by any prior means of which we are aware.

In practicing our invention we have found that the steep wave front impulses obtained when the bridge is balanced are due to corona discharges, or disturbances of either transient or continuing nature in the insulating medium, and that by balancing out the charging current of that insulation with a bridge or with a compensating device, these disturbing currents can be amplified, measured, and their wave form studied by an oscillograph or its equivalent. From the data thus obtained a more accurate understanding of phenomena occuring in insulation under electrical stress is obtained and the characteristics of that medium can thereby be better known. Our invention includes the provision of apparatus by which this data can be taken, as will presently appear.

Our invention can best be understood from the detailed description which follows, reference being had to the drawings in which:

Figure 5 is a circuit diagram of a modified testing device by which our invention is adapted for use in testing cables that are already installed in conduits.

Heretofore, it appears that the presence of surges or pulses of steep wave fronts have not been noticed when alternating current bridges for measuring cable insulation were balanced on a particular cable sample, and the relatively short life of the sample in which these surges occur have not been associated as cause and effect. We have discovered that the phenomena which cause the discharges in a balanced alternating current bridge used heretofore to test cables and the like constitute factors or causes of break down after a relatively short exposure of the sample to working voltages.

As is well understood by those skilled in the art, insulation is at its best when it is a homogeneous medium free from voids and foreign particles. Insulation in this form is capable of withstanding the stresses imposed upon it by high tension electricity for a long period of time without material, thermal, physical or chemical changes.

It has been discovered that if the homogeneousness of the medium is disrupted by the presence of foreign bodies or particles of gas or air, certain physical and chemical changes take place which seem to result in a rapid deterioration and eventual breakdown of the insulation and ultimate rupture in the locality in which the foreign particles or gas appear. It is also well known that when a cable is subjected to high tension electrical stresses, currents are produced in the cable by disturbances of a higher frequency than that of the tension stressing the cable. The presence of these currents have been detected heretofore by the use of a receiver, such as an ordinary telephone receiver, and this detection has been used as a test for the location of trouble in cables. These tests clearly show that the presence of such disturbances in a cable, whatever their cause may be, is an indication that breakdown is approaching.

It has been further discovered that this change whether it be thermal, chemical, or physical, is at least partly caused by a corona discharge through these foreign media such as gas bubbles in the insulation, and we have been able to reproduce trouble conditions of this kind and to observe their behavior under operating conditions. It has also been discovered that disturbances, such as corona discharges, transient discharges or harmonic currents, may also occur in the insulation itself, that is, in those portions of the medium which are apparently perfectly homogenous, although these currents are so small as to be generally undetectable, particularly with the apparatus of the prior art.

Figure 3:
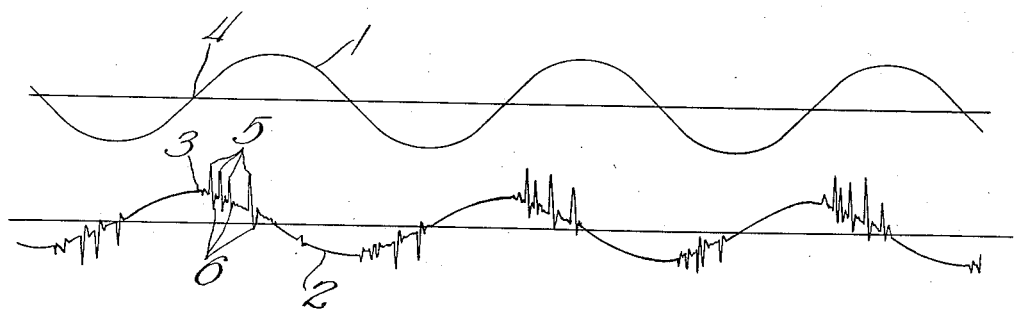
Figure 3 is an oscillogram of the charging voltage and current of a laboratory specimen.

In the oscillogram shown in Figure 3, the sinusoidal curve No. 1 represents the charging voltage applied to a test sample consisting of electrodes immersed in an insulating oil, with a bubble of gas present under one electrode. Curve No. 2 represents the charging current flowing between electrodes responsive to the application of the voltage represented by curve No. 1. It will be observed that the phase relation of the current and voltage is approximately in quadrature, that is, the antinode or point of maximum amplitude of the current wave 2 occurs at the point 3 and at the same instant that the voltage wave 1 crosses through the zero or nodal point 4.

The oscillogram shown in Figure 3 was taken with a bubble of gas introduced in the insulating oil between the electrodes of the testing device. It will be observed that immediately after the current wave has passed through its maximum point 3, its sinusoidal shape is disrupted by discharges or harmonics which momentarily increase the amplitude of the current wave to form peaks 5 that are spaced apart by points of lessened current flow represented by the points 6. Clearly a current of higher frequency than the charging current represented by the curve 2 is superimposed on this charging current. Oscillograms taken under the same conditions, except that there are no gas bubbles in the oil, show no such indication of discharges or harmonics in the charging current, even though an even higher charging voltage is used.

By observation of the performance of the sample during the application of voltage, it was observed that there is a discharge, similar to a corona discharge, through the gas bubble in the insulating oil. It has also been observed that the amount of this visible corona discharge is a function of the amplitude of the current variation in the charging current wave, that is, the strength of the superimposed current is represented by the vertical distance between the high and low points 5 and 6, respectively, on the oscillogram 3. As the applied voltage 1 is increased, increasing the electrical stress in the insulation, the amplitude of the discharges also increases, and the number of discharges increases, that is, the number of peaks 5 in the charging wave is correspondingly increased.

With a cable sample subjected to the conditions under which the oscillogram duplicated in Figure 3 was taken, the discharge currents or harmonic oscillations on the charging current cannot be detected by a testing device such as the oscillograph commonly used in cable testing. This is because these oscillatory currents are too minute or rather are so minute that they cannot be noticed when superimposed on the charging current recorded by an oscillograph. From this it is apparent that faults in service cables which produce disturbances of sufficient magnitude to be made audible by a listening stick have progressed to a very much more advanced stage than the incipient faults measured by the oscillogram in Figure 3. It is also believed, though not as yet rigorously proved, that insulation is deteriorated by such discharges, and that, since the insulation is continuously subjected to electrical stresses, this continuous deterioration may result, ultimately, in breakdown. This phenomenon has been unrecognized heretofore. No testing instrument of which we are aware has been sufficiently sensitive to detect the discharges or disturbances until they are quite pronounced, and hence no study to determine if they actually grow has been possible. Our experiments tend to show such growth, but the data thus far collected is not sufficient basis for a rigorous proof.

This data has, however, enabled us to determine definitely that the presence of these harmonic currents superimposed on the charging current of a cable sample are made evident by an alternating current bridge which balances out the charging current. In order to study the causes of such superimposed currents, we have devised numerous circuit arrangements each of which is advantageous for use under particular conditions, as will presently appear.

Figure 1:
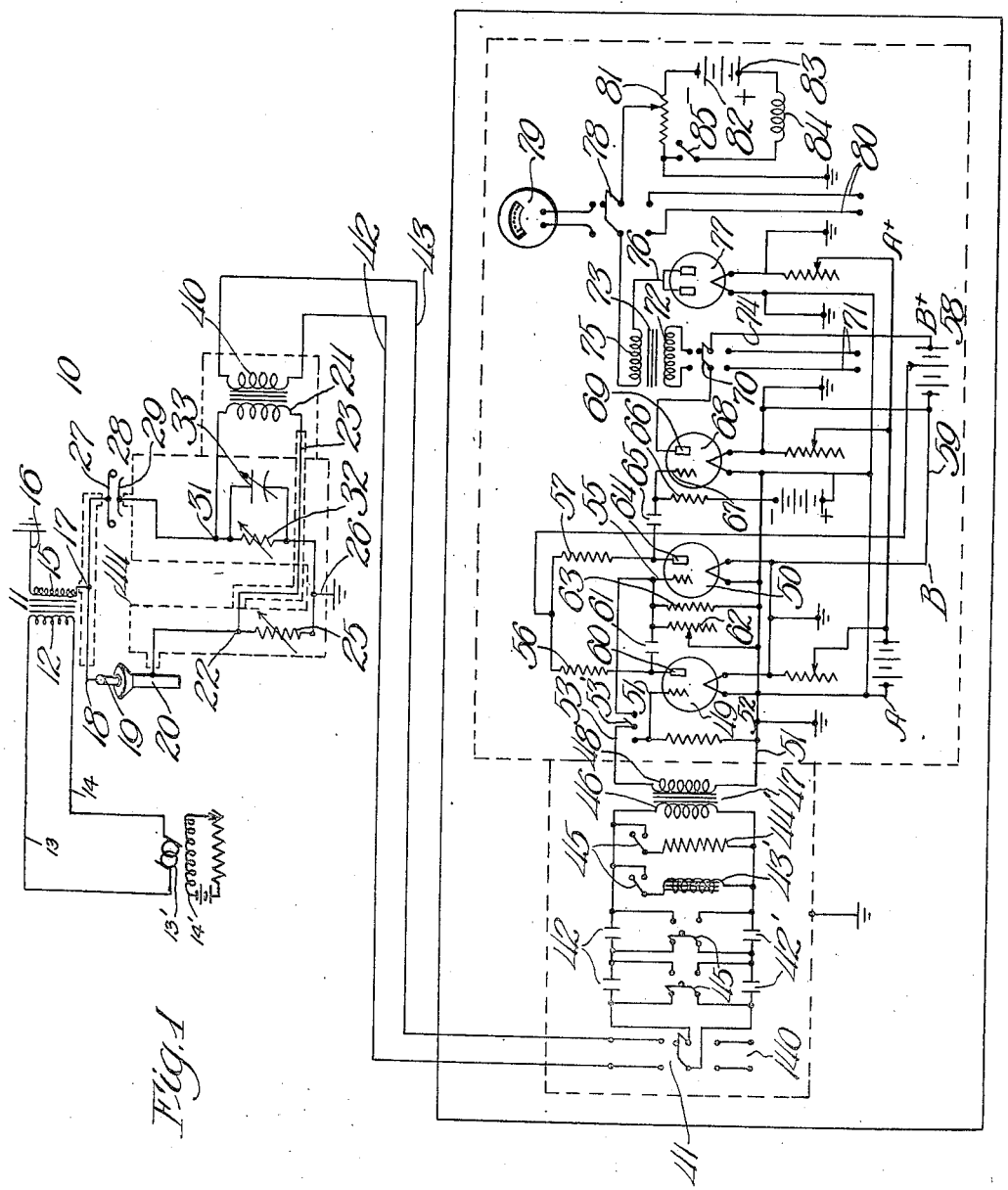
Figure 1 is a circuit diagram of a disturbance detecting and measuring device built in accordance with the teachings of our invention.

The apparatus of our invention, diagrammatically shown in Figure 1, consists of an impedance bridge or compensating device indicated generally at 10 and connected to a supply transformer 11, the primary winding 12 of which is connected to a variable source of alternating current 13' by leads 13 and 14. Preferably, this source produces a 60 cycle alternating current the voltage of which can be varied within the limits required of the cables under test by a suitable control 14', although a source of some other frequency of alternating current may be substituted, if desired. The secondary winding 15 of this transformer has one of its terminals connected to ground at 16 and the other to the junction 17 of the two legs of the bridge 10. Lead 18 extends from this junction to the conductor 19 of the cable under test. The sheath 20 of this sample is connected through the junction 22 to the resistance leg 25 of the bridge, this resistance being variable for the purpose of balancing the bridge to partially balance the fundamental of the charging current and the cable against that of a condenser. The opposite end of the resistance 25 is connected to ground at 26. One end of the bridge output transformer winding 24 is connected to the junction point 22 by a wire 23, for a purpose which will hereinafter appear.

On the other side of the bridge, the junction 17 is connected to one plate 27 of the standard air condenser 28, the opposite plate 29 of which is connected to a variable resistor 32 through junction point 31. The opposite end of the resistance 32 is connected to ground at 26. A variable air condenser 33 is bridged around the resistor 32 to facilitate balancing the bridge. The opposite end of the winding 24 is connected to this side of the bridge at the junction 31.

The mechanics of adjusting and balancing the bridge are not of the essence of the present invention, it being sufficient to say that when the resistors 25 and 32 are properly adjusted and the condenser 33 is properly adjusted, the terminal points 22 and 31 are at the same potential and phase angle, so that there is no supply source potential between opposite terminals of the winding 24 of the bridge output transformer occasioned by the charging current of the cable sample and consequent I R drop in the bridge.

The bridge output transformer, an iron core transformer, has a secondary winding 40 connected through leads 42 and 43 to a double throw switch 41' in the amplifier-detector mechanism. Preferably, the bridge 10 is shielded by a metallic casing 44 indicated by the dotted lines in Figure 1. In certain instances the leads 42 and 43 may likewise be encased in a suitable shield to prevent extraneous electrical disturbances from affecting the reading of the instrument.

The double pole double throw switch 41 is connected to a series of condensers 42', an impedance 43', and a resistance 44', by suitable switches 45, to form a filter which permits only frequencies above a certain cutoff value to pass through it, the filter cutting off all frequencies below that limit, including the unbalanced charging current and its harmonics. The purpose of this filter will be more fully discussed hereinafter.

The filter unit thus formed is connected to opposite ends of the primary winding 46 of the coupling transformer 47, the secondary winding 48 of which is connected to an audio frequency amplifier consisting of thermionic tubes 49, 50 and 68. One terminal of the secondary winding 48 of the transformer is connected at 51 to the filament circuit 52 of the audio frequency amplifier, and the other terminal 53 is connected to a single pole double throw switch 53' for connection either to the grid 51 of the tube 49 or to the grid 55 of the tube 50. By this arrangement, the number of stages of amplification in the audio frequency amplifier may be varied. Obviously, by suitable arrangement of switches, a greater number of thermionic tubes may be incorporated in this amplifier; however, we have found that in most instances two or three stages of amplification are all that are required for satisfactory manipulation of the test mechanism.

The plate circuits of the tubes 49 and 50 are led through suitable resistors 56 and 57 to a high voltage battery 58, the negative terminal 59 of which is connected to the filament circuit of the thermionic devices. The plate 60 of the tube 49 is connected to the grid 55 of the tube 50 by a condenser 61, a variable resistor 62, and fixed resistor 63, this coupling being in the form of the usual resistance coupling employed in radio frequency amplifiers. Similarly, the plate 64 of the tube 50 is connected through a condenser 65 and resistance 66 through the grid 67 of the thermionic amplifier 68.

The plate 69 of this amplifier is connected to a double pole double throw switch 70, through the operation of which it can be connected either to the lead 71 or to the primary winding 72 of the transformer 73, the opposite end of the winding being connected by lead 74 to the high voltage terminal of the battery 58. The secondary winding 75 of this transformer is connected to the plates 76 of the thermionic rectifier 77 and also to the double pole switch 78, through the operation of which it can be connected to the direct current indicating device 79, preferably, a micro ammeter, or to the leads 80 leading out of the test mechanism. The opposite end of the indicating device 79 is connected through a resistor 81 to the negative terminal of the battery 82. The positive terminal 83 of the battery is connected through a choke 84 to the single pole switch 85, through the operation of which it is connected to the opposite terminal of the resistor 81 and to ground.

In the operation of the test mechanism shown in Figure 1, the cable sample is connected in the manner shown in the drawings, and leads 13 and 14 are connected to a source of alternating current, preferably, 60 cycles, of known voltage. The switch 41 is thrown to connect the filter and amplifier unit to the bridge, and the bridge is balanced while the sw'tch 70 is turned downwardly to connect it to the lead 71 to which a suitable head phone is connected. Preferably, during the first stages of balancing of the bridge, the double throw switch 53' is connected to the right so that only one amplifier 50 is inserted. By adjustment of the resistors and capacities of the bridge 10, a point is reached in which the tone heard in the receiver connected to lead 71 is minimum, at which time the switch 53' is thrown in the opposite direction to vary the sensitivity of the bridge, and the adjustment of the bridge may then be reset to a more perfect balance.

When the minimum tone is obtained in the receiver, a characteristic scratching noise is heard, which is due to the minute ionization discharges in the voids or gas bubbles in the insulation. The switch 70 is thrown in the opposite direction to connect the transformer 73 to the output side of amplifier 68. The switch 78 may be thrown upwardly to connect the output side of the rectifier tube 77 to the indicator 79, or it may be drawn downwardly to connect the output side of the rectifier through the leads 80 to a loud speaker or an oscillograph or any other suitable indicating device.

When the bridge is balanced, or as near balanced as it is possible to make it, the points 22 and 31 are at substantially the same potential insofar as concerns the fundamental of the source of potential 13. The filter unit, by proper manipulation of the switches 45 to compensate it for the frequency being used on the primary side of the supply transformer 11, can be made to damp out the harmonics produced in the secondary winding 15 of the supply transformer, those harmonics being present particularly if the supply transformer is a commercial transformer or if the voltage is not a sinusoidal wave.

The energy delivered to the amplifier and detector unit is caused by the corona discharges through the foreign materials or voids in the insulation between the conductor 19 and sheath 20 of the cable, and the amount of this corona discharge can be indicated by the indicator 79. The amplification constant of the amplifier unit being known by suitable calibration of the device, the amount of corona discharge is thus measured. From the measurement thus taken, the degree of impregnation of the cable, and consequently the safe voltage upon which the cable can be operated, can be readily determined. The seriousness of the fault in the insulation of the cable may also be determined by increasing the voltage through the primary winding 12 of the supply transformer 11. This increases the potential and insulation stresses between the conductor 19 and sheath 20 of the cable sample, and increases the corona discharges in the cable insulation thereby increasing the deflection of the indicator 79. By suitable correlations of the readings of the indicator 79, we believe the character and seriousness of the weak spot or incipient fault in the cable can be definitely determined and the cable can be accepted, rejected or relegated to lower tension work, as the case may require.

Figure 4:
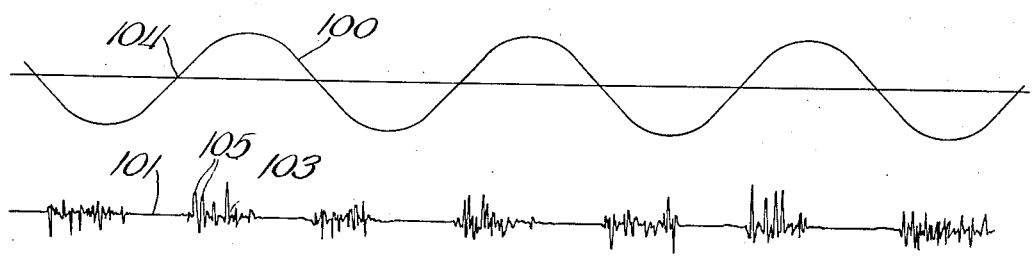
Figure 4 is an oscillogram of the discharge currents of a commercial cable section obtained through the use of the device of our invention.

Heretofore it has been impossible to obtain an oscillogram showing the corona discharge current in a cable sample of length comparable to that found in practice. This is because the value of the charging current is so high that the oscillograph has to be shunted down to such an extent that it is not sufficiently sensitive to record the rapid and comparatively small changes in current occasioned by the corona discharges, which changes are, of course, also shunted down. By using the bridge or compensating circuit above referred to, the charging current can be balanced out to form a straight line, and the corona discharges of a standard length of cable can be photographed on an ordinary oscillograph. The oscillogram shown in Figure 4 is an oscillogram taken on a standard length of cable. In this figure the voltage curve 100 is a sinusoidal curve. The charging current is completely suppressed by the action of the bridge or compensation device and the action of the filter unit in damping out the unbalanced part of this charging current and the harmonics thereof. The ionization discharges in the cable length are indicated at 103, and it will be observed that the positioning of these discharges is approximately the same as in the case of the laboratory sample whose oscillogram is shown in Figure 3. The number of peaks 105 occurring in the ionization discharge current 103 indicate the seriousness of the particular discharge, by indicating the amount of discharge. The voltage of the supply wave 100 being known, the seriousness of the incipient fault in the cable can thus be determined.

Oscillograms such as that shown in Figure 4 may be taken by throwing the switch 78 of the amplifier detector mechanism to the downward position connecting the output of the detector tube 77 through the leads 80, to which leads the oscillograph element which records the variations in the charging current of the cable is connected. Usually a high power amplifier is needed to give sufficient definition to these variations to cause them to produce a readable oscillogram. By control of the amplification constant of this amplifier, suitable sensitivity can be obtained. Preferably, a resistance coupled amplifier is used for this purpose. The filter unit, when properly adjusted, damps out any harmonics which may occur in the charging voltage. As a result the oscillograph element connected to the lead 80 draws a line that deviates from a straight line in accordance with the ionization discharge current or other disturbance currents in the cable section.

Figure 2:
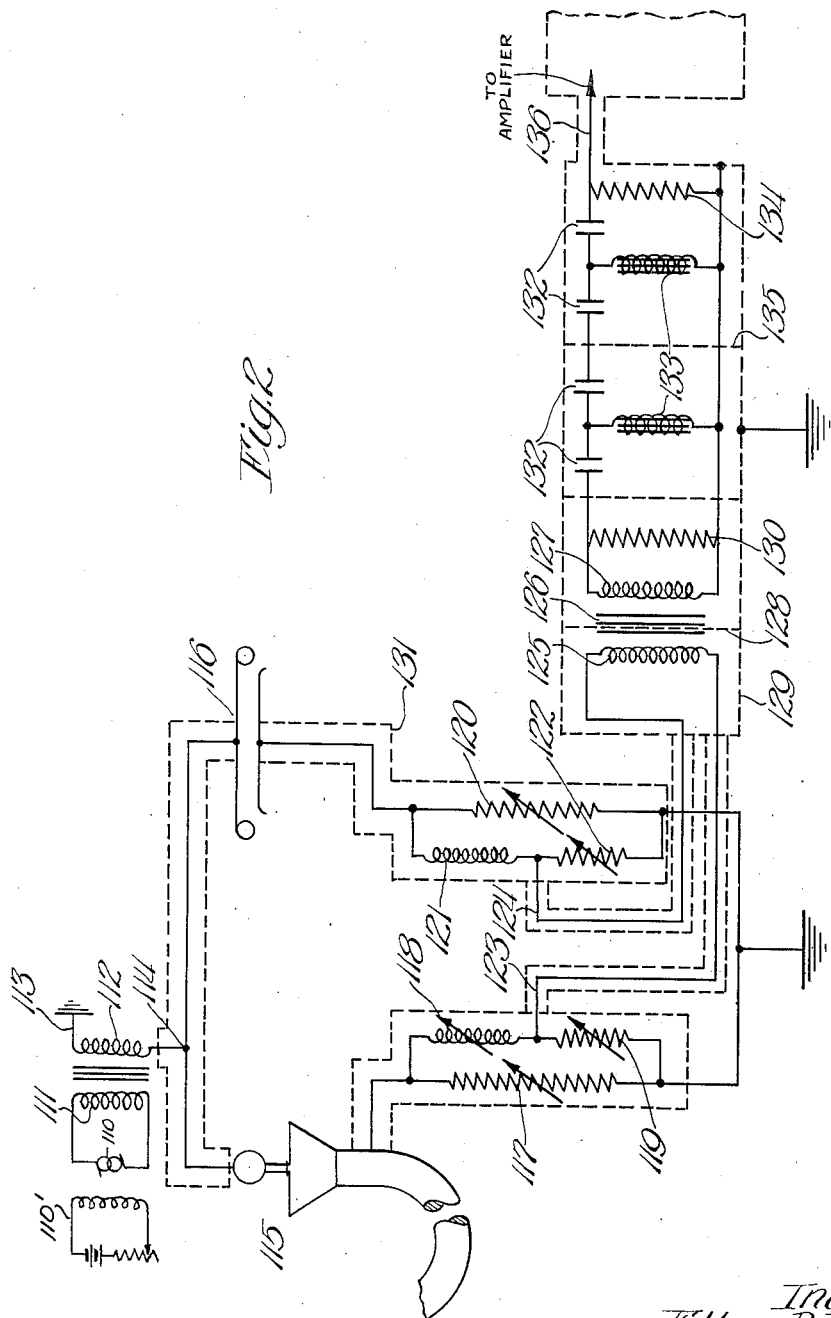
Figure 2 is a circuit diagram of a modified form of testing device which balances out corona discharges in the supply transformer and test device leads.

It frequently happens that the wave characteristics of a source of 60 cycles alternating current contain a large number of harmonic frequencies which may cause corona discharge. Also, the leads extending to the test mechanism may pick up induced disturbances which if not erased will affect the accuracy of the test. In Figure 2, we have shown a modified form of bridge arranged to suppress such disturbances in the supply current while detecting discharges in a cable section or a condenser. In this modification, the source of alternating current 110 is connected to the primary 111 of the supply transformer, and the secondary 112 of that transformer is connected to ground at 113 and to the bridge at 114. The voltage of the source 110 is controlled by a suitable control device 110'. The cable test sample 115 is connected into the bridge as before, and a standard air condenser 116 also occupies the same relative position as in the bridge shown in Figure 1.

The resistances 117 and 120 of the usual alternating current bridge are used. In shunt with the resistance 117 is a variable inductance 118 and another variable resistance 119, while in the opposite legs of the bridge the second variable resistance 120 is shunted by a fixed inductance 121 and a variable resistance 122. The detecting leads 123 and 124 are respectively connected to the junction of inductance 118 and coil 119 and to the junction of inductance 121 and resistance 122. By suitable adjustment of the variable members of the bridge, a balance can be obtained as before, balancing out the charging current to the cable section 115. The detecting leads then pick up the corona discharge, these leads terminating in a primary winding 125 of the detecting transformer 126.

This detecting transformer 126 is an iron core transformer whose primary winding 125 is electrostatically shielded from the secondary winding 127 by a shielding member 128 interposed between the two windings. In addition, the transformer is shielded by shielding means 129 which completely surrounds the two windings and core of the transformer and the high resistance resistor 130 shunted across the secondary winding of the transformer. As in the case of the standard alternating current bridge described in Figure 1, the elements of the bridge are shielded by a suitable shielding means 131, indicated by the dotted lines in Figure 2.

Figure 2 also shows a simplified form of high pass filter comprising condensers 132, impedances 133 and a resistance 134, all of which are contained in a suitable shielding 135 from which the output lead 136 which is terminated upon a suitable switch such as the switch 53' in the amplifier detector unit of Figure 1. This filter permits only frequencies above a fixed value to pass through it and blocks all frequencies below that value. The bridge circuit of Figure 2 balances out the charging current of the sample and any extraneous currents that originate in the source of that current, and the filter acts as a safeguard to prevent any such currents that may get past the bridge from entering the amplifier units. By the combined action of the bridges and filter unit it is assured that all voltages impressed upon the output lead 136 of the filter, and thereby conducted to the input of the amplifier detector, are free from extraneous disturbances and therefore capable of accurately indicating the intensity of the ionization, discharge, or other high frequency disturbances. Harmonic currents in the insulation of the sample under test may be determined by simply removing the filter. By suitable calibration of the indicators of the detector amplifier unit shown in Figure 1, the comparative seriousness of such disturbances in a cable when it is subjected to a fixed voltage can be accurately determined and, if desired, an oscillogram of the discharges or total harmonic residue of the changing current can be taken by the arrangement shown in Figure 2 when it is connected to the amplifier detector unit shown in Figure 1.

In order to calibrate the indicator 79 so that the ratio between its scale deflections and the current in the corona discharge can be accurately determined, the switch 41 may be thrown to a downwardly position connecting it to the leads 140 to which a calibrating generator may be attached. This generator is capable of producing discharge currents of known quantity which are fed through and amplified by the aperiodic amplifier to give a resulting deflection on the indicator 79. By knowing the input current to the system and the deflection caused thereby the amplifier detector unit can be calibrated so that, when it is connected to a cable sample, the value of disturbance current represented by a given deflection of the meter 79 is known.

The bridge shown in Figure 1 or the bridge shown in Figure 2, preferably the latter, can be constructed as a semiportable unit and employed in the manufacture of cables, condensers, and the like to determine the homogeneity of the insulating media used in those devices. The bridge and amplifier unit can also be transported to a cable section that has been installed, for instance in a conduit, and the condition of that cable can be likewise determined, it being understood, of course, that the cable is disconnected from the commercial source of current and connected to a portable supply, consisting of a suitable generator and transformer, during the testing period. While these bridges are capable of this use, they are not particularly adapted for it and are unwieldy of operation if the cable section is long. We have therefore provided a modified form of bridge which is particularly adapted for testing installed cable sections having permanently grounded sheaths so that a bridge apparatus cannot be inserted into the cable circuit.

In Figure 5 we have illustrated this embodiment of our invention by the usual circuit symbols. In this figure, the cable section 160 is a long section of the kind such as are usually installed in conduits leading from a generating station to a substation, or between substations or from a substation to intermediate distributing points. Such cable sections invariably are composed of a plurality of lengths of cable joined by suitable splices. The cable section 160 is grounded by contact with the conduits, cable racks, etc., as indicated at 161.

The electrical conductor 162 of the section is disconnected from the commercial current source to which it is connected while in service and connected to a test current source consisting of transformer 163. This source contains a secondary winding 164 one end of which is grounded at 165, and the other end is connected to the conductor 162 by a lead 166. The primary winding 167 of the transformer is connected to a suitable source of variable voltage alternating current.

The test bridge or compensating device comprises a three plate air condenser 170, the middle plate 171 of which is connected to the cable conductor 162. Plates 172 and 173 of this condenser are movable with respect to the plate 171. Thus the capacity between plates 171–172 or 171–173 can be varied to produce unbalances in the bridge circuit whereby the minute currents resulting from ionization surges in the cable have unbalanced paths through the bridge arms to ground, and are therefore detectable.

The condenser plate 172 is connected to one of the legs of the bridge which comprises variable inductance 174 and variable resistance 175 serially connected between that plate and ground at 176. The condenser plate 173 is similarly connected to the other leg of the bridge, which leg comprises only the variable resistance 177 connected between that plate and ground at 176. The primary winding 178 of the bridge output transformer 179 is connected between the junction of the resistance 175 and inductance 174 and the junction between condenser plate 173 and the resistance 177. The secondary winding 180 of this transformer 179 is connected to the input terminals of the filter unit 181. The output of this unit is connected to a detector amplifier unit 182. The filter and amplifier units used with this bridge may be the units shown in Figures 1 or 2, or any other suitable units within the teachings of our invention.

It will be noted that the bridge or compensating device of Figure 5 is capacity coupled to the cable section under test and that this coupling is variable. By suitable manipulation the bridge can be adjusted to balance out the cable charging current and its harmonics, and the extraneous currents that may come from the test current source. Discharge currents originating in the insulation of the cable section are transmitted through the bridge and filter unit to the detector amplifier unit where they are measured and indicated as before. Harmonic components of the charging current caused by the condition of the insulation may be measured by disconnecting the filter. By this test the condition of the cable insulation can be periodically checked if desired.

If routine tests of cables in service are made at frequent intervals and accurate data of the corona discharge currents at a given voltage is recorded at each of these tests, any tendency toward deterioration of the insulation of the cable or growth of incipient faults therein can be determined and the proper steps made to remedy the condition before a rupture occurs. If, for example, the cable is a cable leading from a generating station to a substation, it will consist of a plurality of individual sections and the probability is that only one of these sections is at fault. Having determined that there is a weak spot or spots in the cable, the location of that spot can be determined, preferably in a manner outlined in the copending application of Paine, Tykociner and Brown, Serial No. 504,045, filed Dec. 22, 1930, to which application reference is here made for the details of the method employed to locate the fault in a cable section. Having located the fault in one of the plurality of sections comprising the feeder lead, that section can be repaired or replaced, as the occasion demands, and a breakdown of the lead can be prevented.

Obviously a great amount of data must be collected and analyzed before it can be accurately determined how strong the disturbance currents in a particular cable or cable section can grow before the danger of breakdown becomes imminent, and to date we have not collected sufficient data to enable us to accurately anticipate breakdowns. The data of the tests that we have made indicates that changes in the insulation quality of a given piece of cable are occurring and from this we believe that the useful life of cables in service can be predetermined by our invention.

Our invention is capable of a great many applications, and while we have illustrated it in connection with the testing of cables, we have done so by way of example only and are not to be limited to this specific application of the invention. We are aware that condensers and a great many other electrical devices employing insulation can be tested, and incipient faults in the insulation located, by the method and means herein outlined.

Having thus complied with the statutes, and shown and described a preferred embodiment of our invention, what we consider new and desire to have protected by Letters Patent is pointed out in the appended claims.

What is claimed is:

1. The method of testing insulation which comprises impressing a known potential on a sample, balancing out the charging current of said sample, filtering out the harmonics of said potential and current, and measuring the high frequency discharge currents set up in the insulation by said potential.

2. The method of testing insulation which comprises impressing a known potential on a sample, balancing out the charging current of said sample, filtering out the harmonics of said potential and current, and connecting a sensitive measuring device to the sample to detect and measure the electrical disturbances in it.

3. The method of testing insulation which comprises impressing a known potential on a sample, balancing out the charging current of said sample, filtering out the harmonics of said potential and current, and amplifying and rectifying the high frequency discharge currents set up in the sample by said potential.

4. In a dielectric testing mechanism, the combination of a source of variable voltage constant frequency alternating current for impressing potential on the sample under test, a bridge network for balancing out the charging current of the sample, and means for measuring the disturbance currents produced in the sample by said potential.

5. In a dielectric testing mechanism, the combination of a source of variable voltage constant frequency alternating current for impressing potential on the sample under test, a compensating device for balancing out the charging current of the sample, and means for amplifying and measuring the high frequency disturbance currents produced in the sample by said potential.

6. In a dielectric testing mechanism, the combination of a source of variable voltage constant frequency alternating current for impressing potential on the sample under test, a bridge network for balancing out the charging current of the sample, a high frequency amplifier for amplifying the surge currents produced in the sample by said potential, and means for measuring said amplified currents.

7. In a dielectric testing mechanism, the combination of a source of variable voltage constant frequency alternating current for impressing potential on the sample under test, a bridge network for balancing out the charging current of the sample, a high pass filter for damping out the harmonic frequencies of said source, and means for measuring the surge currents produced in the sample by said potential.

8. In a dielectric testing mechanism, the combination of a source of variable voltage constant frequency alternating current for impressing potential on the sample under test, a bridge network for balancing out the charging current of the sample, a high pass filter for damping out the harmonic frequencies of said source, and means for amplifying and measuring the high frequency surge currents produced in the sample by said potential.

9. In a dielectric testing mechanism, the combination of a source of variable voltage constant frequency alternating current for impressing potential on the sample under test, a bridge network for balancing out the charging current of the sample and the surge currents and induced disturbances in the supply current, and means for measuring the surge currents produced in the sample by said potential.

10. In a dielectric testing mechanism, the combination of a source of variable voltage constant frequency alternating current for impressing potential on the sample under test, a bridge network for balancing out the charging current of the sample and the surge currents and induced disturbances in the supply current, a high pass filter for damping out the harmonic frequencies of said source, and means for amplifying and measuring the high frequency surge currents produced in the sample by said potential.

11. In a dielectric testing mechanism, the combination of a source of variable voltage constant frequency alternating current for impressing potential on the sample under test, a bridge network for balancing out the charging current of the sample, a high frequency amplifier for amplifying the surge currents produced in the sample by said potential, and a rectifier for converting said amplified high frequency surge currents into pulsating direct current, and means for measuring said rectified current to thereby measure the surge currents in said dielectric.

12. In a dielectric testing mechanism, the combination of a source of variable voltage constant frequency alternating current for impressing potential on the sample under test, a bridge network for balancing out the charging current of the sample, a high frequency amplifier for amplifying the surge currents produced in the sample by said potential, and a rectifier for converting said amplified high frequency surge currents into pulsating direct current, a direct reading meter, and means for connecting said meter to said rectifier to measure the surge currents in a sample.

13. In a dielectric testing mechanism, the combination of a source of variable voltage constant frequency alternating current for impressing potential on the sample under test, a bridge network for balancing out the charging current of the sample, a high frequency amplifier for amplifying the surge currents produced in the sample by said potential, and a rectifier for converting said amplified high frequency surge currents into pulsating direct current, a direct reading meter, and shielding means for separating said devices and for protecting them from extraneous currents.

14. In a test mechanism for detecting inhomogeneities in dielectrics, the combination of a supply transformer having its primary winding connected to a source of variable voltage alternating current, a testing bridge, a connection between the secondary of said transformer and the bridge, and means connected to the bridge for detecting surges in the charging current supplied to the dielectric through the bridge to thereby detect the presence of inhomogeneities in the dielectric.

15. In a test mechanism for detecting inhomogeneities in dielectrics, the combination of a supply transformer having its primary winding connected to a source of variable voltage alternating current, a testing bridge having a plurality of legs into one of which the dielectric under test is connected, a connection between one end of the secondary of said transformer and the junction of two legs of said bridge, a connection between the opposite end of the secondary and ground, a connection between the junction of the opposite legs of said bridge and ground to complete a circuit over which said dielectric is charged from said supply transformer, and means connected to said bridge for detecting, amplifying and measuring surges in the charging current thus supplied to the dielectric.

16. Means for testing cable insulation for a potential, but not yet existing, fault condition, including a condenser comprising the cable insulation under test, means for impressing an ionization producing potential thereon below the breakdown potential of the cable, means for neutralizing the effect of the charging current of the condenser, and means for detecting ionization disturbances in the cable.

17. Means for testing insulation, which comprises means for impressing on the insulation an alternating potential, means for neutralizing the charging current, means for amplifying the remaining current, and means responsive to the amplified current.

18. The method of testing insulation, which comprises setting up a charging current through a condenser the dielectric of which includes the test insulation, setting up an equally effective charging current through a standard condenser, neutralizing the first-mentioned charging current with the second charging current, and detecting the dielectric disturbances remaining after neutralization.

ELLERY B. PAINE.
JOSEPH TYKOCINSKI-TYKOCINER.
HUGH A. BROWN.